US008730860B2

(12) United States Patent
Lohmar et al.

(10) Patent No.: US 8,730,860 B2
(45) Date of Patent: May 20, 2014

(54) PROVISION OF MULTIMEDIA BROADCAST/MULTICAST SERVICE (MBMS) FOR ROAMING SUBSCRIBERS

(75) Inventors: Thorsten Lohmar, Aachen (DE); Hans Bertil Ronneke, Kungsbacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1699 days.

(21) Appl. No.: 11/917,094

(22) PCT Filed: Jun. 21, 2005

(86) PCT No.: PCT/EP2005/052879
§ 371 (c)(1),
(2), (4) Date: Aug. 19, 2008

(87) PCT Pub. No.: WO2006/136203
PCT Pub. Date: Dec. 28, 2006

(65) Prior Publication Data
US 2009/0219848 A1    Sep. 3, 2009

(51) Int. Cl.
*H04W 72/00* (2009.01)

(52) U.S. Cl.
USPC ........ 370/312; 370/310; 455/403; 455/422.1; 455/432.1

(58) Field of Classification Search
USPC ............. 370/310, 312; 455/403, 422.1, 432.1
See application file for complete search history.

(56) References Cited

U.S. PATENT DOCUMENTS

| 2004/0072555 | A1* | 4/2004 | Grech et al. | 455/403 |
| 2004/0132402 | A1 | 7/2004 | Agashe et al. | |
| 2005/0170842 | A1* | 8/2005 | Chen | 455/454 |
| 2005/0195760 | A1* | 9/2005 | Lee et al. | 370/312 |

FOREIGN PATENT DOCUMENTS

WO    WO 2004030293 A1 * 4/2004

OTHER PUBLICATIONS

3$^{rd}$ Generation Partnership Project; Technical Specification Group Services and System Aspect: Multimedia Broadcast/Mulsticast Service (MBMS); Architecture and functional Description (Release 6) 3GPP TR 23.846 6.1.0,XX,XX, Dec. 1, 2002, pp. 1-114.*
3$^{rd}$ Generation Partnership Project; Technical Specification Group Services and System Aspects: Multimedia Broadcast/Multicast Service (MBMS); Architecture and functional Description (Release 6) 3GPP TR 23.846 6.1.0, XX, XX, Dec. 1, 2002, pp. 1-114.

* cited by examiner

*Primary Examiner* — Un C Cho
*Assistant Examiner* — Siming Liu (57) ABSTRACT

The present invention proposes a solution for providing multicast/broadcast service to users roaming between different operational domains. In particular it is proposed to provide means enabling the user to contact a home multicast/broadcast server. Said means might be a request being triggered by the user. Said request includes a network identifier identifying the visited operational domain, which is provided to the multicast/broadcast server. The latter decides on a provision method for providing the at least one multicast/broadcast service to the user in the visited operational domain considering rules for a provision of multicast/broadcast services in the visited operational domain and the request triggered by the user. Further the multicast/broadcast server determines a second parameter set for accessing the at least one multicast/broadcast service in the visited operational domain according to the provision method and informs the user about the second parameter set.

24 Claims, 7 Drawing Sheets

PROVISION OF MULTIMEDIA BROADCAST/MULTICAST SERVICE (MBMS) FOR ROAMING SUBSCRIBERS

TECHNICAL FIELD OF THE INVENTION

The present invention relates to providing a multicast/broadcast service for a user roaming between operational domains of a wireless telecommunication network.

BACKGROUND

Multicast/broadcast is a service that permits sources to send a single copy of the same data to an address that causes the data to be delivered to multiple recipients. Under multicast/broadcast only one copy of a message passes over any link in a network and copies of the message are made only where paths diverge. From the network perspective, multicast/broadcast dramatically reduces overall bandwidth consumption, since the data is replicated in the network at appropriate points rather than in the end-systems. Further a server, which is sending multicast message needs to manage only one session.

Multicasting in the internetworking between a fixed network, like for example the Internet or any other IP-based backbone network and a mobile network like, General Packet Radio System GPRS or Universal Mobile Telecommunication System UMTS is currently developed, because especially in the wireless network new challenges occur. These challenges are for example the mobility of the end users and low transmission bandwidth of the mobile network on the air interface, but also the lower reliability due to the packet loss on the radio interface compared to the fixed networks.

Figure 1:
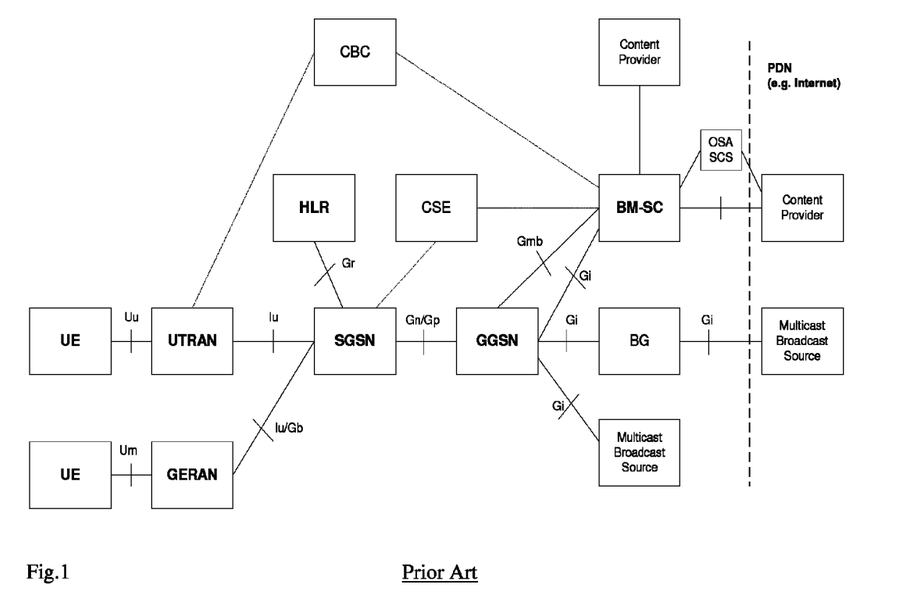
FIG. 1 shows a schematic representation of an architecture of a network providing multicast/broadcast service.

Multicasting in the internetworking between a fixed network and a mobile network like, General Packet Radio System GPRS or Universal Mobile Communication System UMTS is presented in the following according to the actual multimedia multicast/broadcast MBMS architecture of the General Packet Radio System GPRS network as depicted in FIG. 1.

The GPRS is the packet-switched enhancement of the Global System for Mobile Communication GSM, which is a circuit switched network. In GPRS, the user can be permanently online connected paying only for the real data transfer. In order to fulfill the new requirements some changes are introduced into the GSM, amongst other new logical nodes, the Serving GPRS Support Node (SGSN) and the Gateway GPRS Support Node (GGSN). The main functions of the GGSN involve interaction with external IP packet networks providing for example connections to Internet Service Providers ISPs. For the purpose of providing multicast/broadcast service the GGSN can communicate with Broadcast/Multicast Service Centre BM-SC receiving a content from a Content Provider being located either in the mobile network or in the external network, thus the BM-SC entity is responsible for the provision of multicast/broadcast, like for example for bearer establishment and data forwarding. Further possibility for providing multicast/broadcast is by means of a Multicast Broadcast Source, which can be located in the mobile network or in an external network. The SGSN serves all GPRS subscribers that are physically located within the geographical SGSN service area. It forwards incoming IP packets addressed to a mobile station. Additional to the new logical nodes also new interfaces between the nodes are to be defined as it is depicted in FIG. 1.

The similar nodes and interfaces are also used in the next generation of the wireless networks, like the UMTS.

The introduction of multicast/broadcast into wireless network has to deal with problems being relevant for the mobile networks, amongst other with the mobility of the end users and low transmission bandwidth of the mobile network on the air interface.

In particular the mobility of the users has impact on different development directions.

For example due to users movement, different networks are to be constructed to provide service to the customers. Hence, depending on the network co-operation between operators, a possibility is provided to offer the subscribers a coverage area being much wider.

This functionality is called roaming. Roaming might be provided if some administrative and technical constraints are fulfilled. From the administrative point of view, issues like for example charging, subscription agreements must be solved between different operators each offering an operational domain. From the technical point of view some topics are consequence of the administrative matters, such as the transfer of call charges or the transfer of the subscription information between networks. Others are needed simply for roaming to be possible at all, such as the transfer of location data between networks, or the existence of a common access interface.

It should be noted that roaming, in which the user can move and keep access to the service is only possible if some conditions are met. First, the operating domains and their operators must communicate between themselves. For this purpose a number of standardized interfaces is defined, by means of which the so-called Service Layer Agreement SLA might be transferred. Second, the user must have the possibility to access a service in different networks.

In a common praxis, a user has a subscription relationship with a single operating domain, being often called home operating domain, for example, a home PLMN (Public Land Mobile Network). A user usually has access to a service in the home operating domain. The varicosity of the services for accessing depends on the subscription.

Furthermore a distinguishing between a national and international roaming is made, depending whether the operating domains belong to the same or to different countries.

Mobile telecommunications networks, such as GPRS or UMTS, aim to provide services such as voice, data, and multimedia via computing devices over network infrastructures. Particularly, the provision of services being multicasted or broadcasted to the users is an important part of the evolution of these networks. In the following the abbreviation MBMS will be used for the Multicast/Broadcast Multimedia Service.

Currently there are mechanisms for supporting a provision of Multicast/Broadcast services. MBMS services are differentiated in one network using the Temporary Mobile Group Identifier (TMGI). A TMGI uniquely identifies an MBMS bearer, which transports a MBMS service, worldwide. The TMGI is structured in a way that it is possible to define within every network an unique TMGI for a particular service. The TMGI will be described in more details afterwards.

However, if an MBMS UE roams in another MBMS enabled network, the MBMS UE is only able to receive the activated MBMS transmissions, if the visited network supports the service and then the user has to know how to access the service. This means that a visited network in order to provide the home MBMS service to the users visiting it, must also announce MBMS services and sends MBMS notifications for MBMS Services of the foreign networks besides the own service portfolio. Consequently, MBMS roaming is only possible, when potentially all services of all service providers are offered through all mobile networks.

Therefore in order to support roaming, the MBMS functionality is required in all networks. Thus, if a visited mobile network does not support the MBMS feature at all or does not support MBMS roaming, it is not possible to offer MBMS services to users being subscribed to MBMS in the home network and visiting the visited mobile network.

In the current solution, if a network does not offer the MBMS feature at all, then the roaming of the MBMS service does not work when an MBMS UE is roaming into that network. For example, the user might receive for example in a foreign country a MC/BC service in a foreign language, but it is not possible to offer to the user the home MC/BC service in the home language.

Moreover, besides the provision of the technical features, also an agreement on the roaming policy is to be provided. It might be possible that a mobile-network implements MBMS functionality, but the operator does not allow the usage of MBMS for the visiting subscribers, for example to save MBMS recourses for the own users and own services. Consequently, also in this case the roaming solution would not work.

SUMMARY AND DESCRIPTION OF THE INVENTION

Therefore, it is an object of the present invention to provide a solution for providing a roaming of home multicast/broadcast services to mobile users changing the operational domains.

A method, which is to be performed on a multicast/broadcast server, is provided for providing roaming of home multicast/broadcast service to a roaming user. Upon receiving a request triggered by the user being in the visited operational domain for providing at least one multicast/broadcast service in the visited operational domain, the multicast/broadcast server deciders on a provision method for providing the at least; one multicast/broadcast service to the user in the visited operational domain considering rules for a provision of multicast/broadcast services in the visited operational domain and the request triggered by the user. According to this decision the multicast/broadcast server determines a second parameter set for accessing the at least one multicast/broadcast service in the visited operational domain according to the provision method, and the multicast/broadcast server informs the user about the second parameter set.

It is proposed to have a method for a user wishing to access a multicast/broadcast service while roaming to a visited operational domain. Said user being in the visited operational domain triggers a request to the multicast/broadcast server for providing at least one multicast/broadcast service in the visited operational domain. Subsequently, the user receives from the multicast/broadcast server a second parameter set for using said set to access the at least one multicast/broadcast service.

Figure 4:
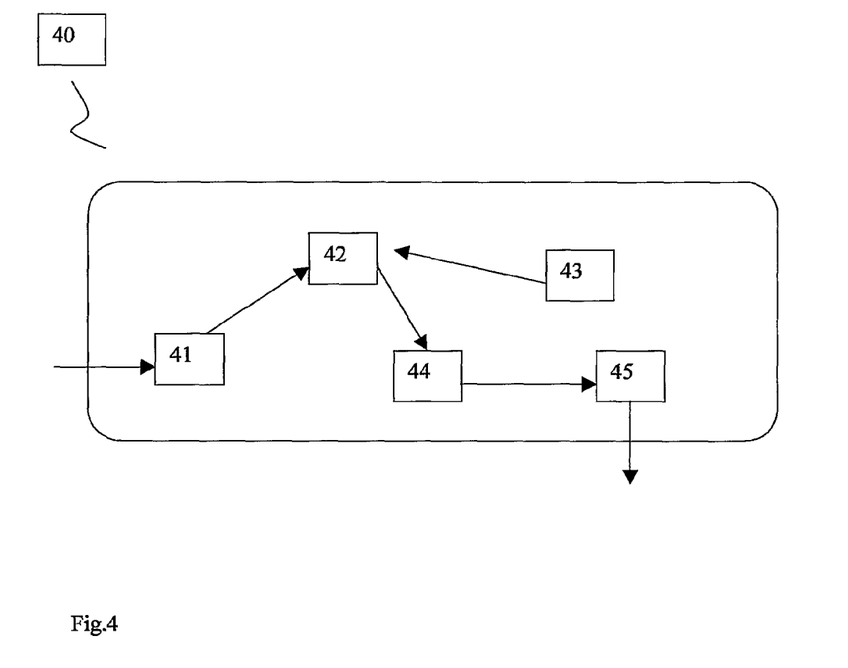
FIG. 4 shows a schematic example of a multicast/broadcast server capable to provide multicast/broadcast service to a user roaming in a visited operational domain.

As a consequence, in the concept of the present invention a Broadcast/Multicast Server is proposed. Said server has a receiving unit 41 for receiving a request triggered by the user being in the visited operational domain for providing at least one multicast/broadcast service in the visited operational domain. Further it has a decision unit 42 for deciding on a provision method for providing the at least one multicast/broadcast service to the user in the visited operational domain wherein said decision unit is adapted to consider rules 43 for a provision of multicast/broadcast services in the visited operational domain and the request triggered by the user.

Further an evaluation units for determining a second parameter set for accessing the at least one multicast/broadcast service in the visited operational domain according to the provision method is provided. A sending unit 45 for sending information to the user about the second parameter set is also foreseen.

Figure 5:
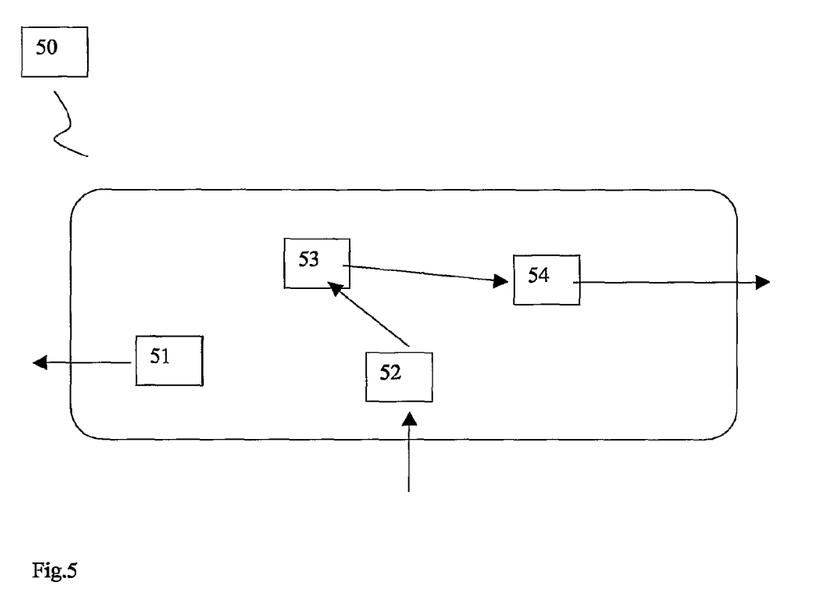
FIG. 5 shows a schematic example of a user capable to access a multicast/broadcast service in a visited operational domain.

Consequently also a user node is proposed with the following units. A triggering unit 51 for triggering a request to the multicast/broadcast server for providing at least one multicast/broadcast service in the visited operational domain is proposed. A receiving unit (52) for receiving a second parameter set from the multicast/broadcast server is further proposed. A configuration unit 53 is foreseen for configuring the parameter list at the user side according to the received second parameter list and an accessing unit 54 for accessing the multicast service.

The advantage of the present invention is that it provides a solution for a roaming of multicast/broadcast services to mobile users changing the operational domains and requiring the provision of the multicast/broadcast services to which said users are subscribed in the home network domain.

Further advantage of the present invention is a simple and easier administration in the operational domains, because it is not required that ever operational domains has to know and to support all services of the other operational domain. The present invention proposes that a broadcast/multicast server being responsible for the user decides on the provision of the required service.

In the following preferred examples of the present invention shall be described in detail, in order to provide the skilled person with thorough and complete understanding of the invention, but these detailed embodiments only serve as examples of the invention and are not intended to be limiting. The following description shall make reference to the enclosed drawings, in which.

It should be noted that the term "part", "node", "module", "server" in the context of the present invention refers to any suitable combination of hardware and software for providing a predetermined functionality in the communication network. In this way, said terms generally refers to a logical entity that can be spread out over several physical entities of the network, but can also refer to a physical entity located in one physical location.

It should be noted that the term "user" in the context of the present invention refers to user equipment and the input of a human, wherein the user equipment is a combination of hardware and software. The user equipment is used and configured by a human providing some input, like for example an initialization to become a part of a multicast group. However, it might be also equipment being adapted to perform the required steps without involvement of a human. However in the following no distinguishing between the equipment and the human will be made and thus the terms "user" and "user equipment" should be seen as having the same meaning.

The description of the possible technical realization of the present invention is based on the network architectures according to FIG. 1. Therefore in the following description the broadcast/multicast server will be called BM-SC. However, this should not be seen as a restriction of the present invention. In particular, it should be noted that the term broadcast/multicast server in the context of the present invention refers to any suitable combination of hardware and software for being responsible for the user in respect of having information regarding provision of multicast/broadcast service in a visited operational domain. The multicast/broadcast server might be located in the home operational domain but it should not be restricted only to this embodiment. It might be for example a separate unit being located independent of the operational domains.

Preferably, the communication network is a mobile communication network, e.g. is a mobile communication network operating according to GSM, GPRS (General Packet Switched Radio) or UMTS (Universal Mobile Telephone System) or any 3G system like for example EDGE, WCDMA, CDMA2000. However, the present invention is also applicable in any communication network providing multicasting or broadcasting of messaging or streams.

Currently in order to access a multicast/broadcast service in home operational network the user has to establish a connection over the network. There are some differences between establishing a connection for multicast or for broadcast. In the first case a user receives an announcement message from the home network about offered multicast services. The user decides which services he/she wants to receive and in the next step a procedure is started for joining a user to a multicast group by means of a protocol called the Internet Group Message Protocol IGMP being used by the users to indicate their wish to join or leave a particular multicast group. The IGMP has been developed for IP version 4. In Internet Protocol IP version 6 there is a similar protocol called Multicast Listener Discovery MLD, which is used for the same purpose as the IGMP.

The User Equipment, UE, becomes part of the MBMS bearer service in case of the multicast mode using a join message. Upon receiving of a join message the system performs steps necessary for attaching a user to a multicast service. If the IGMP message has been successfully process in the infrastructure, then the MBMS UE context is established in GGSN, SGSN and RNC for this certain UE. This procedure leads also to an assignment of a TMGI to the Multicast bearer for the UE in a last step. Thus, the user has a TMGI, which can be compared with the TMGI being sent on a paging channel. This is the way the user is informed about upcoming MBMS transmissions. Upon agreeing on the service, a session start phase is initiated in order to establish a MBMS distribution tree to the user. A more detailed description might be found in the 3GPP TS 23.246 V.6.4.0 (2004-09), chapter 8.2.

However, after the performed activation procedure the user has a first parameter set, including IP Multicast Address, Port Number and Protocol Identifier, being required to access the multicast/broadcast service, the user has registered for.

The difference between the multicast and the broadcast service activation procedure is that in case of broadcast the user does not register by means of IGMP or MLD to any group. Instead of this, the UE receives with the announcement message directly the TMGI for accessing the broadcast service. The user stores said TMGI and uses it for watching the paging channel for MBMS notifications on the radio interface.

As aforementioned, a TMGI uniquely identifies an MBMS bearer, which is used for MBMS notification purpose and for transporting of the MBMS service, worldwide. Usually there is a direct mapping between a TMGI and an IP Multicast address. A multicast flow is identified by the IP Multicast address and the Sender IP address. In some realization of BM-SC it is foreseen that the BM-SC maps the multicast flow to the TMGI.

The BM-SC allocates a globally unique TMGI per MBMS bearer service. The TMGI contains two parts: Globally unique MCC/MNC (PLMN ID) and a local MBMS bearer service identity that is unique within the PLMN and given by the operator. Mobile Country Code (MCC) consists of three digits and it identifies uniquely the country of domicile of the BM-SC. The Mobile Network Code (MNC) consisting of two or three digits. The MNC identifies the PLMN, which the BM-SC belongs to. The length of the MNC (two or three digits) depends on the value of the MCC. The last three octets define a unique value out of the operator's network. Using this six octet TMGI, MBMS transmissions can be associated with networks, the MCC und MNC are coordinated worldwide, and the remaining octet is given by the operator.

Therefore if an MBMS UE roams in another MBMS enabled network, the MBMS UE is only able to receive the activated MBMS transmissions, if the globally unique TMGI is also used in the foreign network.

Figure 2:
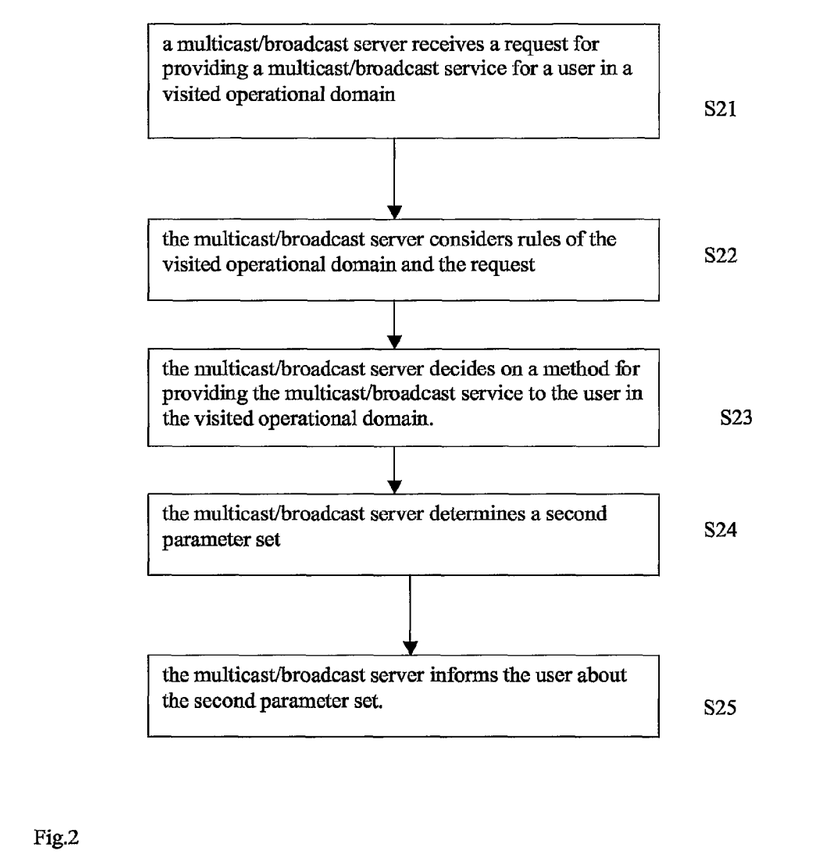
FIG. 2 shows a flowchart of an embodiment of the present invention for a multicast/broadcast server for providing MBMS service to a roaming user.

In the following an embodiment of the present invention in respect to FIG. 2 is given. FIG. 2 describes steps, which are to be performed on the multicast/broadcast side according to the present invention.

It is to be assumed, that a user has just roamed to a visited operational domain (or has just switched on the phone in the visited network), which might be recognised according to an announcement received from the visited operational domain. According to the present invention a multicast broadcast server receives a trigger from a user, S21, for providing a multicast/broadcast service to said user in the visited operational domain. This might be done directly after attaching to a visited operational domain, or the user might at first performs an attachment to the visited operational domain in order to get the multicast/broadcast service and in case of access refusal to said service in the subsequent step a trigger to the home operational domain might be initiated. The result of this procedure is a network identifier identifying the visited network is provided to the user. The identifier might be based for example on the different MNC and MCC. As it is further described the multicast/broadcast server needs the network identifier for distinguishing which set of rules are to be applied.

It is to be noticed that the multicast server being responsible for a user in one embodiment might be a multicast/broadcast server being located in the home operational domain. In other embodiment it might be any multicast/broadcast server administrating the data of the user.

Further it is to be noticed that the trigger received from the user might be either generated by the user, user equipment or by the visited operational domain. In the last case the visited operational domain gets a notice about a roaming user, when said user tries to access the multicast/broadcast service in the visited operational domain, and said visited operational domain would send a request over any suitable interface between the visited and the home network for serving said user to the multicast/broadcast server being responsible for the user. For It is also possible that the visited network send a message to the user, who subsequently contacts the home operational domain.

The triggering message might be realised in any suitable way. Further it is to be noticed that the request message might be either a pure notification message informing the home network that the user is in a visited network, or it might include additional information, like for example a list of multicast services, which the user is interested to receive in the visited network. It is proposed that the message includes the identifier of the visited network, which the user has received during the attaching phase.

In one embodiment it is foreseen to receive a signaling message from the user, which might be realised by means of any suitable signaling protocol, like for example Signaling Information Protocol SIP or Service Management System SMS.

In another embodiment it is proposed that the broadcast/multicast server receives a HTTP message from the user. In a further embodiment it is proposed to receive information from a user by means of a PDP connection.

The triggering request might be for example only a short notification message from the user informing that said user is in a visited operational domain. In this case the server might have stored additional information regarding the broadcast/multicast service the user is interested in. In another embodiment, said notification message might be followed by additional messages including information about the multicast/broadcast services the user is interested to, or it might be a combination of a notification message carrying parallel information about the multicast/broadcast services the user is interested in.

However according to the invention the triggering request should carry at least an identifier of the visited network, which might be for example delivered form the different MNC and MCC. With this information the UE would use any suitable way, like HTTP to inform the BM_SC about the visited network and to request the second data set.

Returning to FIG. 2, in step S22 the multicast/broadcast server considers the information received either directly or indirectly from the user. As already mentioned this information might be an indication that the user is in a visited network plus the identification of the visited network, e.g. MCC & MNC. It might be also a message including a list of services the user is interested in plus also the identification of the visited network.

Additionally the present invention proposes that the multicast/broadcast server considers rules for a provision of multicast/broadcast services in the visited operational domain. Herein the network identifier included in the request triggered by the user identifies the visited operational domain. Said rules are rules upon which the home and the visited operational domains regarding handling of roaming users have agreed. In this context, said rules might be for example that the user has a pre-paid subscription and therefore it is not allowed to have services while roaming and therefore the home operational domain decides to provide said user with services by itself. Further examples might be that the provision of the home services is only value in a specific geographical area of the visited network (e.g. only in a big city) and the user must request new parameters, as soon as it moves out of this area (but remains in the visited network).

This kind of information might be exchange dynamically for example by means of Service Layer Agreement SLA interface.

In another embodiment it is proposed to store this information in the server. Preferably it is proposed in this case to provide a method for updating the static stored information.

Returning to FIG. 2 in the subsequent step S23 it is proposed that the multicast/broadcast server decides on a method for providing the at least one multicast/broadcast service to the user in the visited operational domain.

According to the present invention it is proposed that a multicast/broadcast server chooses one of the bearers, namely unicast or multicast or broadcast. The decision can be for example to use unicast bearers (Interactive or streaming bearers) if the visited network does not support MBMS or does not allow MBMS roaming.

The MBMS knows the first parameter list and according to the list, in particular according to the transmission mode of the multicast/broadcast service in the home operational domain, a matching transmission mode in the visited operational domain might be chosen.

Currently there are methods available for describing a service, like for example an aggregated service announcement document according to RFC 2557, including information about accessing and provision a service. Said description includes among other things entries about IP address TMGI, provided transmission method and so on.

For example in case the MBMS services (regardless whether multicast mode or broadcast mode) is based on the MBMS streaming delivery method, then the multicast/broadcast server might decide to use a unicast packet switched streaming solution. Moreover the multicast/broadcast server might decide whether to use UDP or TCP as transport protocols for transporting streaming data over a unicast packet switched connection.

In case of MBMS services based on the MBMS Download delivery method, usually based on UDP, the multicast/broadcast server might decide to use a unicast download solution such as WAP-Push being based on TCP.

In this context it is to be mentioned that multimedia services are delivered to the users via media streaming or download techniques. To download content, the user clicks on a link and waits for the content to be downloaded and playback to begin. To access streaming data, the user clicks on a link to start playback, which is almost immediate. Therefore depending on the delivery technique different transport protocols are applied.

Further, in case of multicast/broadcast services which uses multicast/broadcast streaming and multicast/broadcast download delivery methods simultaneously, for example in case of a Mobile TV service with interactivity, the BM-SC may decide to provide the unicast service e.g. by packet-switched streaming (for the TV feed) and SMS (for voting purpose).

Furthermore, in case the visited network has a MBMS roaming agreement, said visited network might allow the home operator to use a pre-defined set of MBMS bearers for MBMS roaming purpose. The home operator may then decide, which home-services to map on MBMS in the visited operational network.

For example in case an operator of the visited network expects a high MBMS UE density, which justifies the use of MBMS bearer resources (e.g. during an event), it might decide to forward some or all TMGIs of the home network also through the visited network. This rule is to be given to the home operational domain, and the user would be informed to use the first parameter set.

Alternatively, if the visited operational domain decided to map to an international version of the services, then the user would get an update on the second set of parameters. In this case the update would include configuration parameters of the visiting network (e.g. TMGI with MCC and MNC of the visiting network). In this context an international version of a service is the home service, but e.g. with English audio language.

Returning to FIG. 2, in the subsequent step S24, the multicast/broadcast server determines a second parameter set for accessing the at least one multicast/broadcast service in the visited operational domain according to the provision method.

Preferably, the second parameters set is a configuration parameter set for a configuration of local settings for accessing the broadcast/multicast service in the visited operational domain.

A further example might be, that the second parameter set is only valid for a specific time (e.g. time of the Olympic games).

As soon as the second parameter set becomes invalid, the UE must request new parameters although remaining in the same visited network.

The second parameter list has to carry the decision made by the multicast/broadcast server. Thus, for example in case the decision is to use unicast download in the visited operational domain for providing multicast/broadcast service, then the broadcast/multicast server might add the user to a WAP-PUSH list or an Multimedia Messaging Service MMS distribution list. Consequently, the user in the visited network only gets a notification, that the home-parameter set shall not be used in the visited network.

Thus, it is proposed that the second parameters set is either a new parameter set or an updated first parameter set or a first parameter set.

It is proposed that the second parameter is an update of the first parameter set, if only small modifications are applies.

For example the TMGI is modified in case of a broadcast service.

The second parameter set is a new parameter set, when for example the visited network supports MBMS roaming, but via different IP multicast addresses and TMGIs. In this case the user gets the necessary information, like for example the different IP multicast addresses and TMGIs for accessing said service. Maybe also the number of delivery methods may be different in the roaming case, which means that in the home operational domain the user gets for example one data flow by means of multicast and another one by means of broadcast and in the visited network for example only by means of multicast.

Further it is proposed that the second parameter set is equal to the first parameter set, if the visited network supports MBMS roaming and also allows forwarding of traffic via the home TMGI.

Preferably in case the broadcast/multicast server decides to use the existing first parameter set, said server might sends only a notification, like for example a flag, for informing the user to use the existing first parameter set.

Further it is proposed that the second parameter set may include additional information, like for example geographical information, which might be used in case the service is not available in the entire PLMN.

In order to stay consequent it is proposed to use the same format of stariing data as in the case of the first parameter set and replace only the relevant entries by the new parameters. For example the same aggregated service announcement document according to RFC2557 might be used.

Finally in respect to FIG. 2, in step S25 the broadcast/multicast server sends the second parameter set to the user. The broadcast/multicast server may use different methods to deliver the second parameter set to the user. An example is to use the WAP-PUSH or SMS for delivery.

Figure 3:
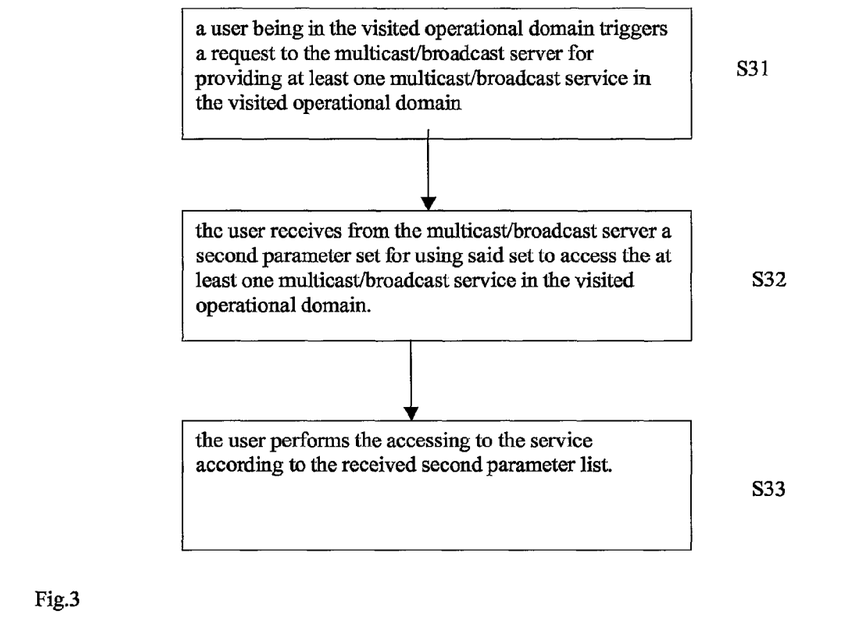
FIG. 3 shows a flowchart of an embodiment of the present invention for a user wishing provision of a multicast/broadcast server in a visiting operational domain.

In the following the present invention will be described in respect to FIG. 3. FIG. 3 depicts method steps, which are to be performed on the user side.

Assuming that a user is roaming to a visited operational domain. The user has a first parameter set, which is used to access home multicast/broadcast service in the home operational domain.

If a user entries a visited operational domain, it performs at first an attach to said domain by means of a GPRS attach, IMSI attach or combined GPRS/IMSI attach procedure. It recognizes that it is in a foreign network and it triggers a request to the multicast/broadcast server for providing at least one multicast/broadcast service in the visited operational domain, S31.

Further it is to be noticed that the trigger from the user might be either generated by the user or by the user equipment. However, in the further description no distinguishing will be made, but a general term "user" will be used.

In case the user generates a trigger for requesting a multicast/broadcast service, the user has to know the responsible multicast/broadcast server, in particular information is required how to contact said server. The triggering message might be realised in any suitable way.

Further it is to be noticed that the request message might be either a pure notification message informing the home network that the user is in a visited network, or it might include additional information, like for example a list of multicast services, which the user is interested to receive in the visited network.

In one embodiment it is foreseen to send a signaling message to the broadcast/multicast server. Hereby the user needs to know the address of said server und for example by means of protocols like HTTP or SMS a contact to the server would be established.

In other embodiment it is proposed that the user generates a message from the user. Thus, the user sends a document using HTTP for example to the URL address of the multicast/broadcast server. The message contains an identifier of the visited PLMN e.g. the MCC and the MNC. Additionally a list of multicast/broadcast services the user is interested to use in the visited operational domain might be sent wherein the services might be identified by means of a TMGI addresses, the IP Multicast addresses or the user service identifier.

In a further embodiment it is proposed that a user establish a PDP connection. At first the so-called PDP-Context activation is performed. The PDP context activation is like logging on the IP network. During the PDP Context Activation a tunnel with an identity is created between the user and the GGSN so that information might be exchanged. This tunnel may be used to send said message using e.g. HTTP to the multicast/broadcast server (identified by the URL).

Summarizing, the triggering request might be realised in any suitable way. For example it might be only a short notification message from the user informing that said user is in a visited operational domain. In this case the server might have stored additional information regarding the broadcast/multicast service the user is interested in. In another embodiment, said notification message might be followed by additional messages including information about the multicast/broadcast services the user is interested to, or it might be a combination of a notification message carrying parallel information about the multicast/broadcast services the user is interested to.

Returning to FIG. 3, in the next step, S32, the user receives from the multicast/broadcast server a second parameter set for using said set to access the at least one multicast/broadcast service, wherein the second parameter set is based on the user's trigger request and on rules of the visited operational domain regarding a provision of multicast/broadcast services.

According to the received second parameters set the user configure its settings for accessing the broadcast/multicast service in the visited operational domain. For example the second parameter list might include the information that the user should use in downlink direction a FLUTE protocol, which is (TLO?) and for uplink direction a TCP/IP protocol.

Thus, it is proposed to have different ways of transmitting data, like for example unicast or multicast or broadcast, or streaming or downloading over different bearers. The used transmission method depends on the provision method being decided in the multicast/broadcast server.

As already mentioned the second parameters might be either a new parameter set or an updated first parameter set or an indication to use the first parameter list.

Further it is proposed that the user when receiving the second parameter list either replaces the first parameter set or the first parameter set is saved and set as inactive and the second parameter set is stored as to be used. In case the user returns to his home network domain the first parameter list might be activated again.

In respect to FIG. 3, in step 33 the user uses the second parameter set to access the service, for example either by applying the parameters included in the second parameter list or simply by waiting for data in case of unicast based downloading transmission mode.

In the following the present invention is described according to FIG. 4 presenting a Broadcast/Multicast Server 40 adapted to support a user accessing a multicast/broadcast service and roaming between operational domains. Said server has a receiving unit 41 for receiving a request triggered by the user being in the visited operational domain for providing at least one multicast/broadcast service in the visited operational domain. As already mentioned the trigger might be received either from user or from the visited operational domain.

Further it has a decision unit 42 for deciding on a provision method for providing the at least one multicast/broadcast service to the user in the visited operational domain wherein said decision unit is adapted to consider rules 43 for a provision of multicast/broadcast services in the visited operational domain and the request triggered by the user. The decision method makes a decision according to the method described above describing the adequate method steps.

Further the server has an evaluation unit 44 for determining a second parameter set for accessing the at least one multicast/broadcast service in the visited operational domain according to the provision method, wherein the determination of the second parameter set has been described above. The sending unit 45 is adapted to send information to the user about the second parameter set.

In the following the user node in respect to FIG. 5 is described. The user 50 has a triggering unit 51 for triggering a request to the multicast/broadcast server for providing at least one multicast/broadcast service in the visited operational domain, wherein the trigger message might have any suitable format as it is described above.

Further the user node has a receiving unit 52 for receiving a second parameter set from the multicast/broadcast server and a configuration unit 53 for configuring the parameter list at the user side according to the received second parameter list, wherein the configuration is performed according to a method described above. Further the user has an accessing unit 54 for accessing a multicast service using the configured parameter.

Figure 6:
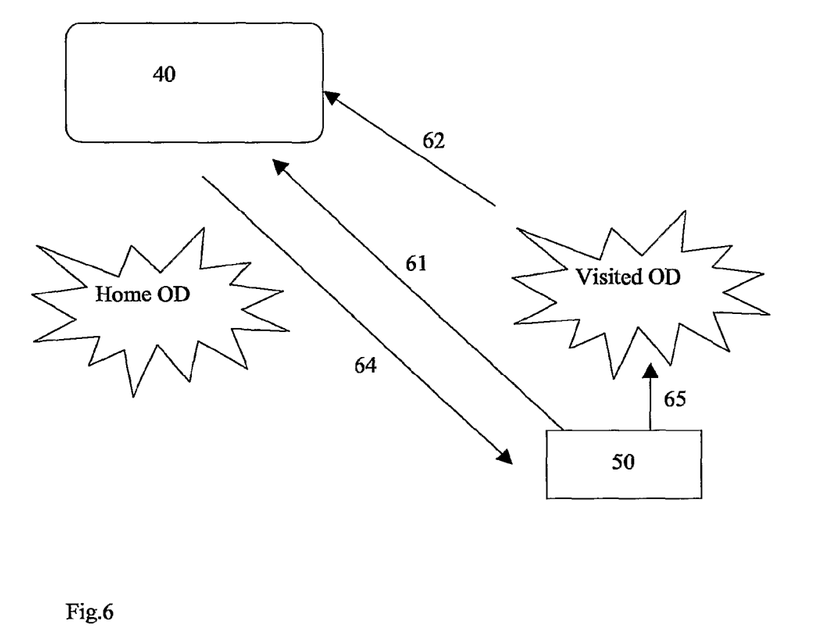
FIG. 6 shows a schematic example of a system capable to provide multicast/broadcast service to a user roaming in a visited operational domain.

In the following a system in respect to FIG. 5 is described. Said system has a multicast/broadcast server as described in respect to FIG. 2 and FIG. 4. Further it has a user as described in respect to FIG. 3 and FIG. 5. It has also interfaces between said server and said user for exchanging information. Further FIG. 6 presents a visited operational domain, Visited OD and a home operational domain, Home OD.

In one embodiment of the present invention it is proposed that a user sends a trigger request message over the interface 61. As already mentioned this message might include further parameter, like a list with multicast groups the user is interested to receive. Upon receiving this message, the server, 40 decides considering also the rules of the visited operational domain, which might be received over the interface 62, about a method for providing the user with the home multicast/broadcast service. Said server determines a second parameter list, which is sent over the interface 64 to the user. The user applies the received second parameter list to access a home multicast/broadcast service in the visited operational domain, over the interface 65.

Figure 7:
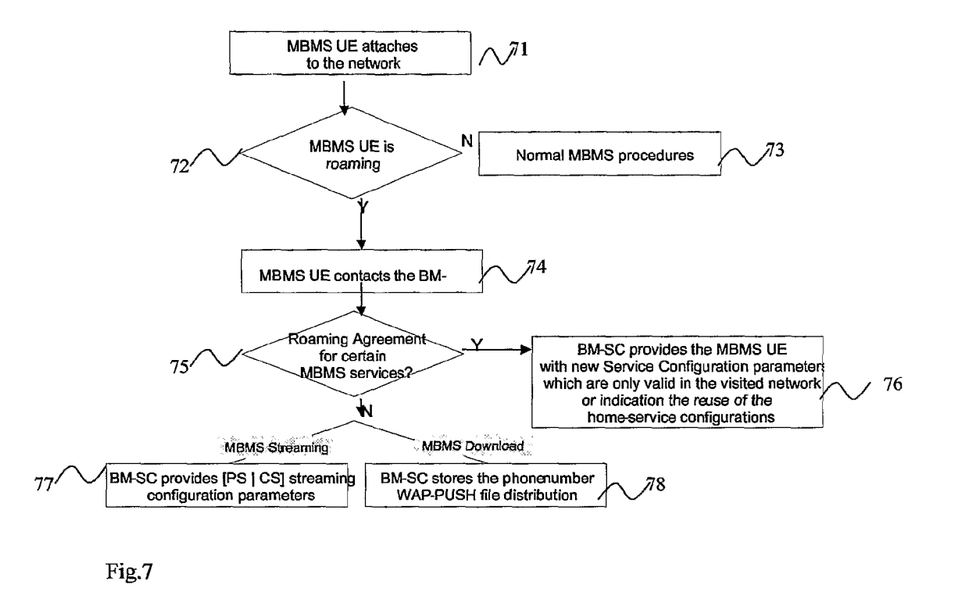
FIG. 7 shows a flowchart of an embodiment of the present invention for providing multicast/broadcast service to a user roaming in a visited operational domain within a system.

In the following an embodiment according to FIG. 7 is presented. FIG. 7 shows steps, which are performed in a system according to FIG. 6.

In step 71, a MBMS UE attaches to a network, by means of IMSI attach, GPRS attach or combined GPRS/IMSI attach procedure. In step, 72 the MBMS UE recognises whether it is roaming or not. In case the user gets the notice of being in the home operational domain, the normal MBMS procedure as currently known is applied, 73. In case the user recognises that it is in visited network, a network identifier of the visited network is provided to the user. In step 74 the MBMS UE contact the BM-SC server, for example by sending a HTML message including the network identifier as it is described above. Upon receiving this message the BM-SC server consider whether there are any roaming agreement with the visited operational domain, 75. If there are agreements then the BM-SC provides the MBMS UE with a new service configuration parameter which are only valid in the visited network or it sends an indication to reuse the parameters as used for accessing the home multicast/broadcast service, 76. In case there are not any roaming agreements, then the BM-SC decides to use unicast. Wherein the server might also decide to provide the multicast/broadcast service in the visited operational domain by means of a unicast based packet-switched or circuit-switched streaming, 77. Alternatively, it might be decided to use download, 78, by means of WAP-Push, MMS.

In case of MBMS streaming service, the MBMS UE gets a new configuration file to activate unicast packet-switched or even circuit-switched streaming. When the user wishes to the service, the MBMS UE would not activate an MBMS streaming reception, but open a unicast packet-switched streaming channel by means of establishing an Real Time Streaming Protocol RTSP session to the streaming server and requesting the stream by mean of a message called RTSP PLAY method. In this case the MBMS UE deactivates the MBMS reception, since the TMGI value range is not globally unique. That means, that the MBMS user stops watch the MBMS notification channel for notifications, marked with the particular TMGI.

In case of MBMS download services the MBMS user would be registered to e.g. a WAP-PUSH group. The content is delivered via unicast methods to the roaming user. WAP-PUSH is typically realized by a combination of an SMS based indication and a Wireless Session Provider WSP or HTTP retrieval. The user would be informed about new content by receiving an SMS. The user would then retrieve the actual content by activating a standard PDP context and downloading the content by HTTP.

The above described embodiments are based on GPRS or UMTS. However, the present invention is not restricted to these networks. It can be employed in every network with different operational domains providing a multicast/broadcast service to roaming users. A further example might be CDMA2000.

The invention claimed is:

1. A method of roaming for a user accessing a multicast/broadcast service between operational domains with a home operational domain providing a multicast/broadcast service to the user, wherein access to the multicast/broadcast service is performed by means of a first parameter set and with a visited operational domain being visited by the user and with a multicast/broadcast server being responsible for the user and performing following steps:
the multicast/broadcast server receives a request including a list of multicast/broadcast services of interest to the user, triggered by the user being in the visited operational domain, for providing at least one multicast/broadcast service in the visited operational domain,
the multicast/broadcast server determines a matching provision method for providing the at least one multicast/broadcast service to the user in the visited operational domain considering the first parameter set and rules provided by the visited operational domain for a provision of multicast/broadcast services in the visited operational domain and the request triggered by the user,
the multicast/broadcast server determines a second parameter set based the request triggered by the user and the rules provided by the visited operational domain for the provision of the multicast/broadcast services for accessing the at least one multicast/broadcast service in the visited operational domain according to the provision method, and
the multicast/broadcast server informs the user about the second parameter set.

2. The method according to claim 1 wherein the request triggered by the user being in the visited operational domain for providing at least one multicast/broadcast service in the visited operational domain includes a network identifier identifying the visited operational domain.

3. The method according to claim 1 wherein the multicast/broadcast server is located in the home operational domain.

4. The method according to claim 1 wherein the request triggered by the user being in the visited operational domain for providing at least one multicast/broadcast service in the visited operational domain can be generated by the user or by the visited operational domain.

5. The method according to claim 1 wherein the request triggered by the user is performed by means of signalling, or by means of an established data connection or by means of an information interface.

6. The method according to claim 1 wherein the list of multicast/broadcast services of interest to the user is stored in the multicast/broadcast server.

7. The method according to claim 1 wherein the provision method is performed by means of a unicast or a multicast or a broadcast transmission.

8. The method according to claim 1 wherein the provision method is performed by means of streaming or downloading of data.

9. The method according to claim 1 wherein the rules provided by the visited operational domain for the provision of multicast/broadcast services in the visited operational domain are rules that the operational domains have agreed.

10. The method according to claim 9 wherein the rules provided by the visited operational domain for the provision of multicast/broadcast services are statically stored or received dynamically.

11. The method according to claim 1 wherein the second parameter set is a configuration parameter set for a configuration of local settings for accessing the at least one broadcast/multicast service in the visited operational domain.

12. The method according to claim 1 wherein the second parameter set is either a new parameter set or an updated first parameter set.

13. The method according to claim 1 wherein the second parameter set includes additional information.

14. A method of roaming for a user accessing a multicast/broadcast service between operational domains with a home operational domain providing a multicast/broadcast service to the user, wherein access to the multicast/broadcast service is performed by means of a first parameter set and with a visited operational domain being visited by the user and with a multicast/broadcast server being responsible for the user wherein the following steps are to be performed by the user:
the user being in the visited operational domain triggering a request including a list of multicast/broadcast services of interest to the user to the multicast/broadcast server for providing at least one multicast/broadcast service in the visited operational domain, and
the user receiving from the multicast/broadcast server a second parameter set to access the at least one multicast/broadcast service, wherein the second parameter set is based on the request, on rules provided by the visited operational domain for a provision of multicast/broadcast services and on the first parameter set.

15. The method according to claim 14 wherein the user has contacting parameters for contacting the multicast/broadcast server.

16. The method according to claim 14 wherein the request triggered by the user being in the visited operational domain for providing at least one multicast/broadcast service in the visited operational domain is generated by the user.

17. The method according to claim 14 wherein the triggering of the request is performed by means of signalling, or by means of an established data connection or by means of an information interface from the user.

18. The method according to claim 14, wherein the list of multicast/broadcast services of interest to the user is stored in the multicast/broadcast server.

19. The method according to claim 14 wherein the user receives the at least one multicast/broadcast service by means of a unicast or a multicast or a broadcast transmission or by means of a streaming or a downloading of data depending on the provision being decided in the multicast/broadcast server.

20. The method according to claim 14 wherein the second parameter set is a configuration parameter set for a configuration of a local settings for accessing the at least one broadcast/multicast service in the visited operational domain.

21. The method according to claim 14 wherein the second parameter set is either a new parameter set or an updated first parameter set or an indication to use the first parameter set.

22. The method according to claim 14 wherein the second parameter set either replaces the first parameter set or the first parameter set is saved and set as inactive and the second parameter set is stored as to be used.

23. A multicast/broadcast server adapted to support a user accessing a multicast/broadcast service and roaming between operational domains with a home operational domain providing a multicast/broadcast service to the user, wherein access to the multicast/broadcast service is performed by means of a first parameter set and with a visited operational domain being visited by the user wherein the multicast/broadcast server comprises:
- receiving unit for receiving a request including a list of multicast/broadcast services of interest to the user triggered by the user being in the visited operational domain for providing at least one multicast/broadcast service in the visited operational domain,
- decision unit for deciding on a provision method for providing the at least one multicast/broadcast service to the user in the visited operational domain, wherein the decision unit is adapted to consider the first parameter set and rules provided by the visited operational domain for a provision of multicast/broadcast services in the visited operational domain and the request triggered by the user,
- evaluation unit for determining a second parameter set based the request triggered by the user and the rules provided by the visited operational domain for the provision of the multicast/broadcast services for accessing the at least one multicast/broadcast service in the visited operational domain according to the provision method, and
- sending unit for sending information to the user about the second parameter set.

24. A user node for accessing a multicast/broadcast service and for roaming between operational domains with a home operational domain providing a multicast/broadcast service to the user node, wherein access to the multicast/broadcast service being performed by means of a first parameter set and with a visited operational domain being visited by the user node and with a multicast/broadcast server being responsible for the user node with a triggering unit for triggering a request including a list of multicast/broadcast services of interest to a user of the user node to the multicast/broadcast server for providing at least one multicast/broadcast service in the visited operational domain, the user node comprising:
- a receiving unit for receiving a second parameter set from the multicast/broadcast server, wherein the second parameter set is based on the request triggered by the user node and on rules provided by the visited operational domain for a provision of multicast/broadcast services and on the first parameter set, a configuration unit for configuring the first parameter set at the user node according to the second parameter set, and
- an accessing unit for accessing a multicast/broadcast service, wherein the second parameter set is used for accessing the multicast/broadcast service.

* * * * *